(12) United States Patent
Kamiyama

(10) Patent No.: US 9,085,295 B2
(45) Date of Patent: Jul. 21, 2015

(54) DRIVE SYSTEM FOR HYBRID VEHICLE

(71) Applicant: AISIN SEIKI KABUSHIKI KAISHA, Kariya-shi (JP)

(72) Inventor: Koji Kamiyama, Kariya (JP)

(73) Assignee: AISIN SEIKI KABUSHIKI KAISHA, Aichi-Ken (JP)

( * ) Notice: Subject to any disclaimer, the term of this patent is extended or adjusted under 35 U.S.C. 154(b) by 127 days.

(21) Appl. No.: 13/904,677

(22) Filed: May 29, 2013

(65) Prior Publication Data

US 2013/0324361 A1    Dec. 5, 2013

(30) Foreign Application Priority Data

May 30, 2012    (JP) .................................. 2012-123163

(51) Int. Cl.
*B60K 6/40*       (2007.10)
*B60W 20/00*    (2006.01)
*B60K 6/48*       (2007.10)
*F16D 48/02*    (2006.01)

(52) U.S. Cl.
CPC .................. *B60W 20/10* (2013.01); *B60K 6/40* (2013.01); *B60K 6/48* (2013.01); *B60K 2006/4825* (2013.01); *B60Y 2400/4244* (2013.01); *F16D 2048/0233* (2013.01); *Y02T 10/6221* (2013.01); *Y02T 10/6252* (2013.01); *Y10S 903/902* (2013.01); *Y10T 477/26* (2015.01)

(58) Field of Classification Search
CPC . B60W 20/10; B60K 6/48; B60K 2006/4825; B60K 6/40; Y10S 903/902; Y10S 477/26; Y02T 10/6221; Y02T 10/6252; B60Y 2400/4244; F16D 2048/0233

USPC ................................................ 903/906; 475/5
See application file for complete search history.

(56) References Cited

U.S. PATENT DOCUMENTS

| 6,533,692 B1* | 3/2003 | Bowen .............................. 475/5 |
| 2011/0115316 A1 | 5/2011 | Isogai et al. |
| 2012/0242198 A1 | 9/2012 | Kasuya et al. |

FOREIGN PATENT DOCUMENTS

| JP | 2006137406 | * | 6/2006 |
| JP | 2006298272 | * | 11/2006 |
| JP | 2011-105192 A | | 6/2011 |
| JP | 2011-109839 A | | 6/2011 |

* cited by examiner

*Primary Examiner* — Sherry Estremsky
(74) *Attorney, Agent, or Firm* — Buchanan Ingersoll & Rooney P.C.

(57) ABSTRACT

A drive system for a hybrid vehicle includes an electric motor including a stator and a rotor, an input hub rotatably connected to an engine, an output hub to which the rotor is mounted, a clutch device connecting and disconnecting the input hub to the output hub, a case including a front sidewall portion, a rear sidewall portion and an outer circumferential wall portion connecting an outer circumferential portion of the front sidewall portion to an outer circumferential portion of the rear sidewall portion and housing the electric motor, the input hub, the output hub and the clutch device, a first bearing on which the input hub is journaled, a second bearing on which the output hub is journaled, and a third bearing positioned between the first bearing and the second bearing and relatively rotatably supporting the input hub and the output hub.

6 Claims, 4 Drawing Sheets

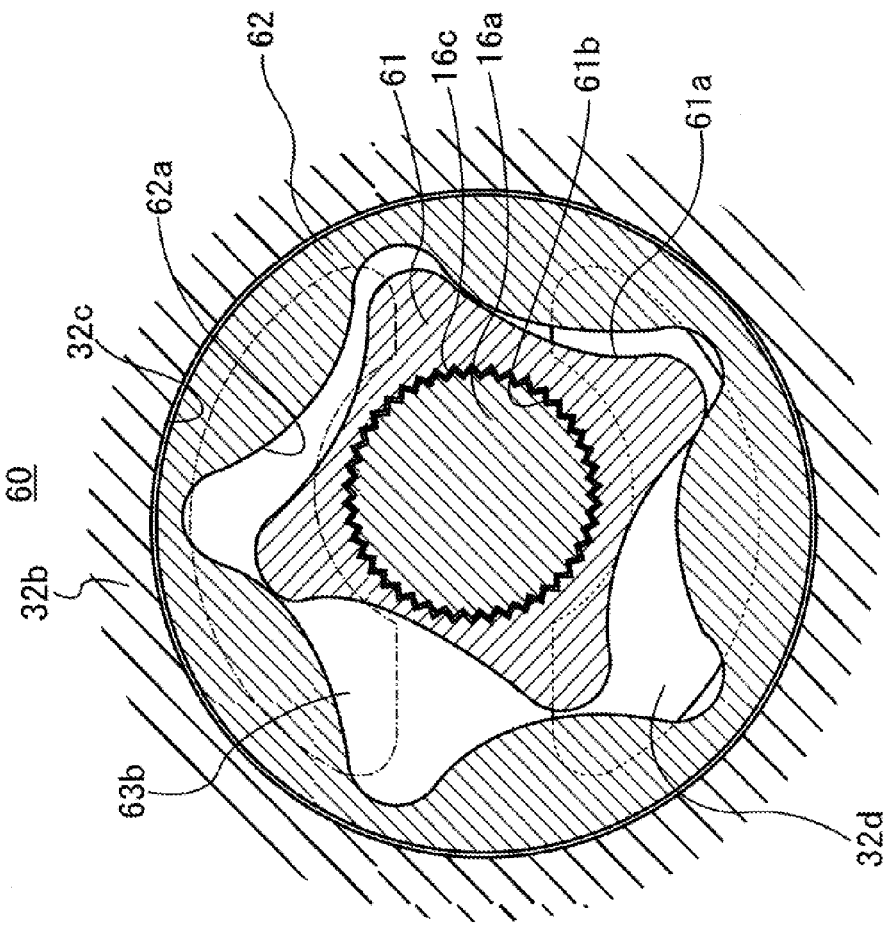
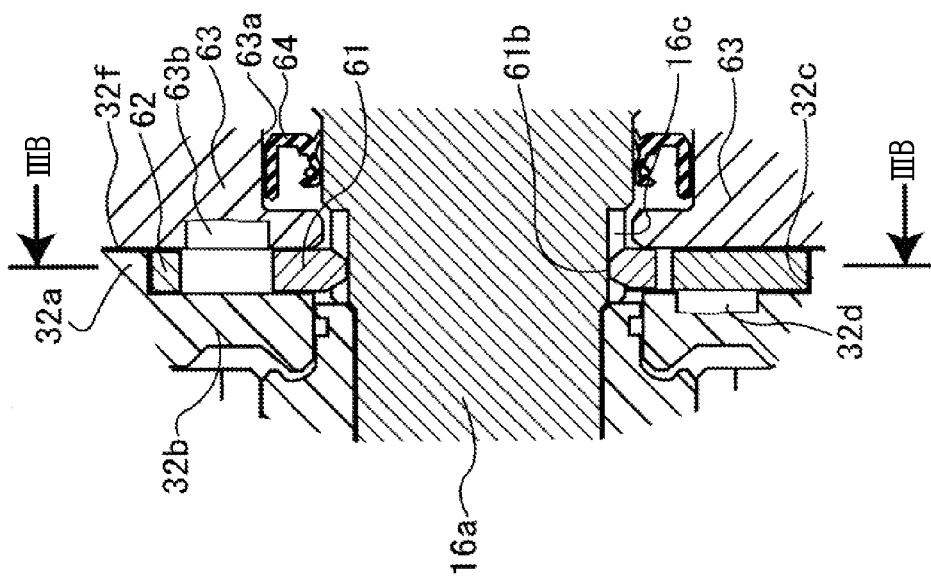

DRIVE SYSTEM FOR HYBRID VEHICLE

CROSS REFERENCE TO RELATED APPLICATIONS

This application is based on and claims priority under 35 U.S.C. §119 to Japanese Patent Application 2012-123163, filed on May 30, 2012, the entire content of which is incorporated herein by reference.

TECHNICAL FIELD

This disclosure generally relates to a drive system for a hybrid vehicle.

BACKGROUND DISCUSSION

A known drive system for a hybrid vehicle is disclosed in JP2011-109839A (hereinafter referred to as Patent reference 1). The drive system disclosed in Patent reference 1 is provided with an electric motor, an input hub to which an engine drive force is transmitted, an output hub which is rotatably connected to an axle, and a clutch device to connect and disconnect the input hub to the output hub. This configuration allows a hybrid vehicle to run only by the electric motor, to use an engine and the electric motor at a same time as power sources when a large drive force is needed, and furthermore, to cause the electric motor to generate electricity by using an engine rotation.

As heavy members, for example, clutch plates, a piston and a coil spring to press the clutch plates, and a rotor of the electric motor are mounted to the aforementioned output hub, a huge load is applied on a bearing on which the output hub is journaled. Thus, according to the known drive system for the hybrid vehicle, the output hub is journaled on the case by a multiple-row angular contact ball bearing to restrain a core vibration of the output hub at a time of a rotation.

However, in a structure where the output hub is journaled on the case by the multiple-row angular contact ball bearing, as a distance between balls of the multiple-row angular contact ball bearing is short, and the output hub is supported by a single angular contact ball bearing at one side, the core vibration of the output hub when the output hub rotates in a high speed is not restrained enough.

A need thus exists for a drive system for a hybrid vehicle which is not susceptible to the drawback mentioned.

SUMMARY

According to an aspect of this disclosure, a drive system for a hybrid vehicle includes an electric motor including a stator and a rotor positioned at an inner circumferential portion of the stator to be rotatably relative to the stator, an input hub rotatably connected to an engine, an output hub to which the rotor is mounted, and a clutch device connecting and disconnecting the input hub to the output hub. The drive system for a hybrid vehicle further includes a case including a front sidewall portion, a rear sidewall portion positioned to face the front sidewall portion, and an outer circumferential wall portion connecting an outer circumferential portion of the front sidewall portion to an outer circumferential portion of the rear sidewall portion and housing the electric motor, the input hub, the output hub and the clutch device, a first bearing on which the input hub is journaled and mounted to the front sidewall portion, a second bearing on which the output hub is journaled and mounted to the rear sidewall portion, and a third bearing positioned between the first bearing and the second bearing relative to a direction of a rotation axis of the input hub and the output hub, and fitting onto the input hub and the output hub, and relatively rotatably supporting the input hub and the output hub.

According to another aspect of this disclosure, a drive system for a hybrid vehicle includes an electric motor including a stator and a rotor relatively rotatable to the stator, an input hub connected to an engine, an output hub to which the rotor is mounted, and a clutch device connecting and disconnecting the input hub to the output hub. The drive system for a hybrid vehicle further includes a case including a front sidewall portion, a rear sidewall portion, and an outer circumferential wall portion connecting an outer circumferential portion of the front sidewall portion to an outer circumferential portion of the rear sidewall portion, the outer circumferential wall portion mounting the stator and housing the electric motor, the input hub, the output hub and the clutch device, a first bearing on which the input hub is journaled and mounted between the front sidewall portion and the input hub, a second bearing on which the output hub is journaled and mounted between the rear sidewall portion and the output hub, and a third bearing positioned between the first bearing and the second bearing, and between the input hub and the output hub, in which the input hub and the output hub are relatively rotatably supported.

BRIEF DESCRIPTION OF THE DRAWINGS

The foregoing and additional features and characteristics of this disclosure will become more apparent from the following detailed description considered with the reference to the accompanying drawings, wherein:

FIG. 3A is an enlarged view of A in FIG. 2 and a cross-sectional view of a trocoid-type oil pump;

FIG. 3B is a cross-sectional view taken along line IIIB-IIIB in FIG. 3A; and

DETAILED DESCRIPTION

An embodiment of a drive system for a hybrid vehicle related to this disclosure will be described with reference to attached drawings as follows. An arrow-headed solid line in FIG. 1 indicates an oil pressure piping connecting between devices while an arrow-headed dotted line indicates a signal line for control. In addition, in this embodiment, a side close to an engine 10 of a drive system for a hybrid vehicle 1 is defined as a front side while a side close to an automated transmission device 5 is defined as a rear side.

Figure 1:
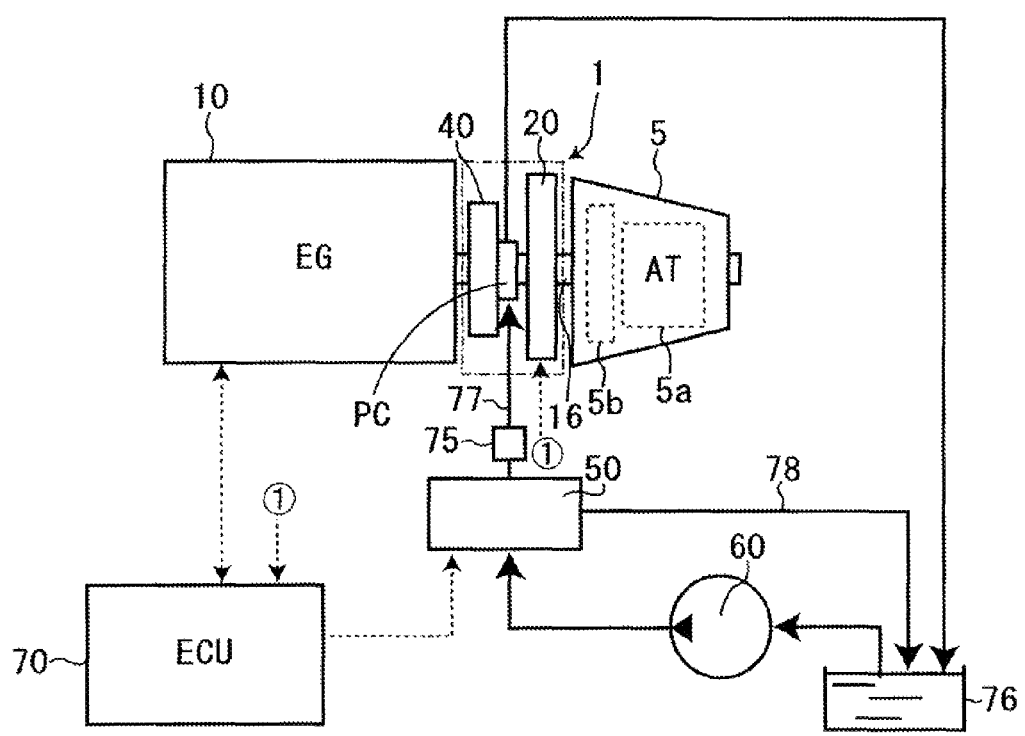
FIG. 1 is a schematic view of a drive system for a hybrid vehicle illustrating an embodiment disclosed here.

As illustrated in FIG. 1, the engine 10 and an electric motor 20 for the vehicle are connected in line via a clutch device 40. The clutch device 40 connects and disconnects the engine 10 to the electric motor 20. Further, the electric motor 20 is connected in line with the automated transmission device 5 of a vehicle, which is connected to a driving wheel of a vehicle.

The automated transmission device 5 includes a transmission 5a and a torque converter 5b and an output of the torque converter 5b is inputted into an input shaft of the transmission 5a. The electric motor 20 and the torque converter 5b are rotatably connected via a turbine shaft 16 which is an input shaft of the torque converter 5b.

As illustrated in FIG. 1, the engine 10 is an ordinary internal-combustion engine that generates an output by a hydrocarbon-based fuel. The electric motor 20 is, however, not limited to, a brushless DC motor while the automated transmission device 5 is a normal planetary gear type automated transmission. The clutch device 40 is a normally closed-type, wet-type multiple disc clutch device that normally connects the engine 10 to the electric motor 20.

Next, in accordance with this disclosure, the drive system for the hybrid vehicle 1 will be described in detail with reference to FIG. 2. The drive system of the hybrid vehicle 1 includes the clutch device 40 and the electric motor 20 both housed in a case 30. The drive system for the hybrid vehicle 1 includes an input shaft 41, an input hub 42 and an output hub 26. The input hub 42 and the output hub 26 are housed in the case 30. Further, in descriptions hereinafter, a rotation axis corresponds to a common rotation axis of the input shaft 41, the input hub 42, the output hub 26 and a rotor 21.

The case 30 includes a front sidewall portion 31, a rear sidewall portion 32 and an outer circumferential wall portion 33. The front sidewall portion 31 and the outer circumferential wall portion 33 are made of light-weight aluminum alloy while the rear sidewall portion 32 is made of an abrasion resistant member, for example, iron metal including cast iron that has high abrasion resistance and stiffness.

The front sidewall portion 31 has a substantially disc shape and, at a center of which, a first axial support portion 31a (i.e., an axial support portion or a cylindrically-shaped axial support portion) having a substantially cylindrical shape protruding inwardly (in a rear direction) of the case 30 is formed. A first bonding surface 31b is formed in an up-down direction at a rear of an outer circumferential portion of the front sidewall portion 31.

The rear sidewall portion 32 has a substantially disc shape and is positioned to face the front sidewall portion 31. At a center of the rear sidewall portion 32, a second axial support portion 32a having a substantially cylindrical shape protruding inwardly (in a front direction) of the case 30 is formed. A pump wall portion 32b having an annular plate-shape is formed at a proximal end (to a rear end) of the second axial support portion 32a extending radially inward.

The outer circumferential wall portion 33 includes a cylindrical portion 33a, having a substantially cylindrical shape and forming an outer circumferential portion of the case 30, and a sidewall portion 33b having an annular plate shape and extending radially inward from a rear portion of the cylindrical portion 33a. At a front of the cylindrical portion 33a, a second bonding surface 33c is formed and closely connects to the first bonding surface 31b of the front sidewall portion 31. Then, the outer circumferential portion of the front sidewall portion 31 and a front portion of the cylindrical portion 33a are fasten by first bolts 34 and nuts 35 multiply positioned in a circumferential direction thereof, to connect the front sidewall portion 31 to the outer circumferential wall portion 33. Further, an outer circumferential portion of the rear sidewall portion 32 and an inner circumferential portion of the sidewall portion 33b are fastened by second bolts 36 multiply positioned in a circumferential direction thereof, to connect the rear sidewall portion 32 to the outer circumferential wall portion 33.

The input shaft 41 includes an axial portion 41a formed at a front portion (close to the engine 10), a cylindrical portion 41b connected to a rear portion of the axial portion 41a and protruding in a rear direction, and a bonding portion 41c which is a flange type extending from a rear end of the cylindrical portion 41b radially outward (up-down direction). In addition, the axial portion 41a, the cylindrical portion 41b and the bonding portion 41c are formed coaxially in one another. The axial portion 41a of the input shaft 41 is rotatably connected to the output shaft of the engine 10 through a flywheel and a damper which absorbs a rotation vibration.

The input hub 42 includes a first tubular portion 42a having a substantially cylindrical shape and a second tubular portion 42b formed in a front of the first tubular portion 42a radially outward, a third tubular portion 42c formed in a rear of the second tubular portion 42b radially outward, and a connection portion 42d which connects a front end of the first tubular portion 42a, a rear end of the second tubular portion 42b to a front end of the third tubular portion 42c. Further, the first tubular portion 42a, the second tubular portion 42b and the third tubular portion 42c are formed coaxially in one another. A rear end of the first tubular portion 42a is bonded to an outer circumferential portion of the bonding portion 41c of the input shaft 41 to integrate the input shaft 41 and the input hub 42. By such a structure, the input hub 42 is rotatably connected to the output shaft of the engine 10.

A first inner race 81b of a first bearing 81 fits onto an outer circumferential surface of a base portion (front portion) of the first axial support portion 31a of the front sidewall portion 31, to mount the first bearing 81 to the first axial support portion 31a. According to the embodiment, the first bearing 81, a second bearing 82, and a third bearing 83 are deep groove type ball bearings. The first bearing 81 and the third bearing 83 are provided at radially outward relative to the second bearing 82. The first bearing 81 and the third bearing 83 are provided at opposite sides relative to the input hub 42 in an axial direction. A first outer race 81a of the first bearing 81 fits onto an inner circumferential surface of the second tubular portion 42b of the input hub 42, which is rotatably journaled on the front sidewall portion 31. The axial portion 41a of the input shaft 41 is positioned in the first axial support portion 31a and protrudes in a front direction from the front sidewall portion 31. By such a structure, the input shaft 41 integrally attached to the input hub 42 is rotatably journaled on the front sidewall portion 31.

A first seal member 85 contacting an outer circumferential surface of a base portion of the axial portion 41a over an entire circumference is provided at an inner circumferential surface of the first axial support portion 31a. As illustrated in FIG. 2, the first seal member 85 is positioned radially inward relative to a direction of the rotation axis from the first bearing 81 is mounted, to prevent a leak in the case 30. The first seal member 85 is provided within a range of the first bearing 81 in the axial direction of the input shaft 41. In addition, a fourth bearing 86 by which the axial portion 41a is journaled on the case 30 is attached between an outer circumferential surface of the cylindrical portion 41b of the input shaft 41 and the inner circumferential surface of the first axial support portion 31a. Further, the fourth bearing 86 is a needle bearing. In those circumstances, an use of a thin needle bearing as the fourth bearing 86 prevents the drive system for the hybrid vehicle 1 from a size increase in a radial direction and firmly supports a load in a radial direction of the input shaft 41 and the input hub 42.

A fifth bearing 87 is positioned between a rear end of the first axial support portion 31a and the bonding portion 41c extending in a radial direction, orthogonal to the fourth bearing 86 in a radial direction and allows a relative rotation of the input hub 42 which is integrated into the axial portion 41a relative to the case 30 while restricting a move of the input shaft 41 to a front direction. A sixth bearing 88 is positioned between the bonding portion 41c and a first connection portion 26c orthogonal to the fourth bearing 86 in the radial direction and restricts a move of the input shaft 41 to a rear direction (close to the turbine shaft 16) in the axial direction. Further, the fifth bearing 87 and the sixth bearing 88 are needle bearings. As such, the use of a thin needle bearing as the fifth bearing 87 and the sixth bearing 88 prevents the drive system for the hybrid vehicle 1 from a size increase in a longitudinal direction and firmly supports a load in the radial direction of the input shaft 41 and the input hub 42.

At an outer circumferential portion of the third tubular portion 42c, a first set of clutch plates 43 having an annular shape are attached movable in a longitudinal direction and unmovable in a circumferential direction (integrally rotatable).

The output hub 26 includes a fourth tubular portion 26a having a substantially cylindrical shape, in which an inner spline 26f is formed at an inner circumferential surface of the fourth tubular portion 26a, a fifth tubular portion 26b formed in a substantially cylindrical shape radially outward of the fourth tubular portion 26a, the first connection portion 26c connecting a middle portion of the fourth tubular portion 26a to a middle portion of the fifth tubular portion 26b, a sixth tubular portion 26d formed in a substantially cylindrical shape radially outward of the fifth tubular portion 26b, and a second connection portion 26e connecting a rear end of the fifth tubular portion 26b to a rear end of the sixth tubular portion 26d. Further, the first connection portion 26c is inclined from an outer circumference to an inner circumference to position from a front direction to a rear direction.

A second outer race 82a of the second bearing 82 fits onto an inner circumferential surface of the second axial support portion 32a of the rear sidewall portion 32, resulting that the second bearing 82 is mounted to the second axial support portion 32a. A second inner race 82b of the second bearing 82 fits onto an outer circumferential surface of a rear direction of the fourth tubular portion 26a of the output hub 26, which is rotatably journaled on the rear sidewall portion 32 by the second bearing 82. Further, a side surface of the second outer race 82a of the second bearing 82 is attached to an inner sidewall of the pump wall portion 32b in an axial direction, while the side surface of the second outer race 82a of the second bearing 82 is positioned by a C ring 89 fitting onto the inner circumferential surface of the second axial support portion 32a in the direction of the rotation axis.

A third outer race 83a of the third bearing 83 fits onto the inner circumferential surface at a front of the fifth tubular portion 26b of the output hub 26 while an third inner race 83b of the third bearing 83 fits onto an outer circumferential surface of the first tubular portion 42a of the input hub 42. By such a structure, the input hub 42 is journaled by the first bearing 81, the third bearing 83 and the fourth bearing 86 while the output hub 26 is journaled by the second bearing 82 and the third bearing 83. In other words, the input hub 42 and the output hub 26 are relatively rotatably supported by the third bearing 83. The input hub 42 and the output hub 26 are relatively rotatable via the third bearing 83.

A second set of clutch plates 44 having an annular shape is positioned at an inner circumferential portion of a front portion of the sixth tubular portion 26d to be movable in a longitudinal direction and unmovable in a circumferential direction (integrally rotatable). The second set of clutch plates 44 and the first set of clutch plates 43 are positioned alternately to face one another. Once the first set of clutch plates 43 and the second set of clutch plates 44 are pushed in the direction of the rotation axis, the first set of clutch plates 43 and the second set of clutch plates 44 are engaged and accordingly, the input hub 42 and the output hub 26 are rotatably connected while the output shaft of the engine 10 and the input shaft of the automated transmission device 5 are integrally rotated.

The turbine shaft 16 includes an axial portion 16a in which an outer spline 16c is formed at a front thereof, and a link portion 16b formed at a rear end of the axial portion 16a. The axial portion 16a is positioned at the fourth tubular portion 26a while the inner spline 26f and the outer spline 16c are engaged in spline fitting, resulting that the turbine shaft 16 and the output hub 26 are integrally rotated. Further, the link portion 16b is connected to a front cover of the torque converter 5b.

The fourth tubular portion 26a and a front portion of the axial portion 16a are positioned at the cylindrical portion 41b of the input shaft 41. The first tubular portion 42a of the input hub 42 and a rear portion of the cylindrical portion 41b of the input shaft 41 are positioned at a space between the fourth tubular portion 26a and the fifth tubular portion 26b of the output hub 26. Further, a front portion of the fifth tubular portion 26b of the output hub 26 is positioned at a space between the first tubular portion 42a and the second tubular portion 42b of the input hub 42. In other words, the front portion of the fifth tubular portion 26b is positioned radially outward of the first tubular portion 42a. Accordingly, as the aforementioned members are positioned overlapped in a radial direction of the drive system for the hybrid vehicle 1, the width in the direction of the rotation axis of the drive system for the hybrid vehicle 1 is reduced.

Next, the clutch device 40 will be described. The clutch device 40 is for connecting and disconnecting the input hub 42 to the output hub 26 and includes plural clutch plates, the first set of clutch plates 43 and the second set of clutch plates 44, a piston member 45, a coil spring 46 and a stopper member 47.

The stopper member 47 has an annular shape and is fixed to an outer circumferential surface of the fifth tubular portion 26b of the output hub 26 to extend in a radial direction. The piston member 45 includes a base portion 45a having an annular shape and a pressure portion 45b protruded to a front from an outer circumferential portion of the base portion 45a. The base portion 45a is housed in a space formed between the stopper member 47 and the second connection portion 26e, and the pressure portion 45b is positioned protruding to a front between an outer circumferential surface of the stopper member 47 and an inner circumferential surface of the sixth tubular portion 26d. The piston member 45 is positioned movable in a longitudinal direction.

The coil spring 46 is positioned at a space formed between the base portion 45a and the second connection portion 26e and biases the piston member 45 forward. Accordingly, the first set of clutch plates 43 and the second set of clutch plates 44 are pressed and rotatably connected (engaged). On the other hand, in a case where an oil pressure generated by an oil pump 60 is applied to a pressure chamber PC, the space formed between the stopper member 47 and the base portion 45a of the piston member 45, the piston member 45 moves rearward to release a rotatable connection of the first set of clutch plates 43 and the second set of clutch plates 44.

Next, construction of the electric motor 20 will be described. The electric motor 20 includes the rotor 21 and a stator 22 and positioned radially inward of the cylindrical portion 33a of the outer circumferential wall portion 33.

The rotor 21 is a member that generates a rotational torque by interlinking with a rotating magnetic field generated by the stator 22. The rotor 21 is fixed on an outer circumferential portion of the sixth tubular portion 26d of the output hub 26 and integrally rotates with the output hub 26. By such a structure, the rotor 21 is positioned radially inward of the stator 22 in a relatively rotatable manner. The rotor 21 includes a rotor core 21a, a magnet 21b and a retaining member 21c.

The rotor core 21a, configuring a part of a magnetic path, is an annular member in which the magnet 21b is housed. The rotor core 21a includes a stack of annular shape resin steel plates. The rotor core 21a forms plural through holes 21d in a circumferential direction, penetrating in an axial (longitudinal) direction.

The magnet 21b is a bar shape member that generates a flux. The magnet 21b is housed in the through holes 21d of the rotor core 21a. The magnet 21b is magnetized in a thickness direction of a plate to form a different magnetic pole alternately in a circumferential direction at an outer circumferential surface of the rotor core 21a.

The retaining member 21c is an annular member to maintain the magnet 21b housed in the through holes 21d and to fix the rotor core 21a onto the sixth tubular portion 26d of the output hub 26.

The stator 22 is a member generating a rotating magnetic field by a current flow. The stator 22 includes the stator core 22a, a bobbin 22b and a coil 22c. The stator 22 has an annular shape and is fixed onto an inner circumferential surface of the cylindrical portion 33a of the outer circumferential wall portion 33 positioned radially outward of the rotor 21.

The stator core 22a, configuring a part of a magnetic path, is a member to which the coil 22c is wound. The stator core 22a includes plural cores 22d and a stator ring 22e. The cores 22d is a member included a stack of substantially T-shape resin steel plates. The stator ring 22e is a substantially tubular shape member made of a magnetic material. The stator core 22a is configured by press fitting or adhesive fixing of the cores 22d arranged annularly to the stator ring 22e. In addition, the stator ring 22e is fixed by, for example, a bolt, on the inner circumferential surface of the cylindrical portion 33a of the outer circumferential wall portion 33.

The bobbin 22b is a member made of resin to insulate the coil 22c from the stator core 22a. The bobbin 22b is positioned to cover opposite sides of the stator core 22a over an entire circumference.

The coil 22c is a member made from a wire rod, generating a rotating magnetic field by a current flow. The coil 22c wound around the bobbin 22b includes a U-phase coil, a V-phase coil and a W-phase coil, which are configured by a Y-connection. The coil 22c is electrically connected to a controller 70, which controls an amount of electrification or a non-electrification to the coil 22c with reference to a signal from each sensor (for example, a speed sensor, a throttle position sensor and a shift position sensor) for detecting each status.

Next, the oil pump 60 will be described with reference to FIGS. 2 and 3. As illustrated in FIG. 3, the oil pump 60 includes the pump wall portion 32b of the rear sidewall portion 32, an inner rotor 61, an outer rotor 62 and a casing 63. The inner rotor 61, the outer rotor 62 and the casing 63 are made of high abrasion resistant iron metal including cast iron.

As illustrated in FIG. 3A, a close-contact surface 32f is formed in the up-down direction on an outer side (rear side) of the pump wall portion 32b. The close-contact surface 32f closely contacts a casing 63 having a plate shape and the casing 63 is mounted to the rear sidewall portion 32. A flattened cylindrical-shaped space, an outer rotor housing portion 32c, is formed between the close-contact surface 32f and the casing 63. According to the embodiment, a circumferential-shaped space having a circular cross-sectional shape, the outer rotor housing portion 32c is formed in a recession at a rear end of the pump wall portion 32b. Opening to a rearward, the outer rotor housing portion 32c is closed by the casing 63. Alternately, both the pump wall portion 32b and the casing 63 are recessed to form an outer rotor housing portion, or the outer rotor housing portion is formed at a side close to the casing 63.

As illustrated in FIG. 3A, an inserting hole 63a is formed at a center of the casing 63. The axial portion 16a of the turbine shaft 16 inserts into the inserting hole 63a.

As illustrated in FIG. 3, the outer rotor 62 is rotatably mounted to an inside of the outer rotor housing portion 32c. The outer rotor 62 has a flattened circular shape having a circular cross-sectional shape, in a center of which inner teeth 62a is formed to define a space. In the space defined by the inner teeth 62a, the inner rotor 61 is rotatably positioned. The inner rotor 61 has a ring shape, and at a rim of the inner rotor 61, outer teeth 61a are formed. The inner teeth 62a and the outer teeth 61a include plural trochoid curves. The number of the teeth of the outer teeth 61a is less than that of the inner teeth 62a. The outer teeth 61a and the inner teeth 62a are engaged. In addition, a center of a rotation of the outer rotor 62 is eccentric to a center of a rotation of the inner rotor 61.

An inner spline 61b is formed at a center of the inner rotor 61 in an axial direction. The inner spline 61b is fitted by spline fitting into the outer spline 16c formed at a rear portion of the axial portion 16a of the turbine shaft 16. By such a structure, the inner rotor 61 is integrally rotated with the turbine shaft 16.

An inlet port 32d is formed at the pump wall portion 32b to communicate with the outer rotor housing portion 32c. An outlet port 63b is formed at the casing 63 to communicate with the outer rotor housing portion 32c.

As illustrated in FIG. 3A, at an inner circumferential surface of the inserting hole 63a of the casing 63, a second seal member 64 is attached to rearward of an outer circumferential surface of the axial portion 16a over an entire circumference to prevent an oil from leaking outside.

When the turbine shaft 16 (the output hub 26) rotates, the inner rotor 61 rotates as well as the outer rotor 62. The inner rotor 61 and the outer rotor 62 are engaged by the outer teeth 61a and the inner teeth 62a. Then, the space formed between the outer teeth 61a and the inner teeth 62a is sequentially transmitted from the inlet port 32d to the outlet port 63b resulting that an oil is supplied from the inlet port 32d to the outlet port 63b.

As illustrated in FIG. 1, a magnetic valve 50 is connected to the pressure chamber PC in the clutch device 40 via an oil pressure path 77. A pressure reducing valve 75 is positioned at the oil pressure path 77. The magnetic valve 50 is connected to a reservoir 76 (according to the embodiment, the bottom of the case 30 illustrated in FIG. 2) via a reservoir path 78. The outlet port 63b of the oil pump 60 is connected to the magnetic valve 50. The magnetic valve 50 selects either the oil pressure path 77 or the reservoir path 78 and connects either the oil pressure path 77 or the reservoir path 78 to the outlet port 63b. When the magnetic valve 50 connects the outlet port 63b to the oil pressure path 77, the oil fed by pressure by the oil pump 60 is supplied to the pressure chamber PC after the pressure of the oil is regulated by the pressure reducing valve 75. When the magnetic valve 50 connects the outlet port 63b to the reservoir path 78, the oil pressure in the pressure chamber PC is decompressed.

As illustrated in FIG. 1, the controller 70 is electrically connected to the engine 10, the electric motor 20 and the magnetic valve 50. The controller 70 is also electrically connected to an accelerator position sensor, a speed sensor, a brake sensor, and a shift switch for the automated transmission device 5.

Next, an operation of the drive system for the hybrid vehicle 1 will be described. The controller 70 controls the engine 10, the electric motor 20 and the magnetic valve 50 with reference to detection results of, for example, the accelerator position sensor. In a case where the vehicle runs by the drive force of the engine 10, the controller 70 controls the magnetic valve 50 not to apply the oil pressure to the pressure chamber PC illustrated in FIG. 2. The coil spring 46 pushes the piston member 45 forward. Thus, the second set of clutch plates 44 are pressed by the first set of clutch plates 43, resulting that the input hub 42 and the output hub 26 are rotatably connected. The controller 70 controls the engine 10 to output a predetermined drive force. The drive force of the engine 10 is transmitted to the automated transmission device 5 via the input shaft 41, the input hub 42, the output hub 26 and the turbine shaft 16. The drive force of the engine 10 transmitted to the automated transmission device 5 is transmitted to a driving wheel, resulting that a vehicle runs by the drive force of the engine 10. At this time, the electric motor 20 rotates by the drive force of the engine 10 and works as a generator.

In a case where the input hub 42 and the output hub 26 are rotatably connected, the vehicle runs by both drive force of the engine 10 and the electric motor 20 by applying the drive force of the electric motor 20. At this time, the controller 70 controls the magnetic valve 50 not to apply the oil pressure to the pressure chamber PC while controlling the engine 10 and the electric motor 20 to generate each predetermined drive force.

On the other hand, in a case where the vehicle runs only by the drive force of the electric motor 20, the controller 70 controls the magnetic valve 50 to apply a predetermined oil pressure to the pressure chamber PC. When the oil pressure is applied to the oil chamber PC, the piston member 45 acts against a pressure force of the coil spring 46 and moves rearward. As a result, the second set of clutch plates 44 is disconnected from the first set of clutch plates 43, resulting that the connection of the input hub 42 and the output hub 26 is released. The controller 70 controls the electric motor 20 to output a predetermined drive force. The drive force of the electric motor 20 is transmitted to the automated transmission device 5 via the output hub 26 and the turbine shaft 16. The drive force of the electric motor 20 transmitted to the automated transmission device 5 is transmitted to the driving wheel and a vehicle runs by the drive force of the electric motor 20.

In a case where the brake sensor detects that a brake pedal is applied, the controller 70 controls the magnetic valve 50 to apply a predetermined oil pressure to the pressure chamber PC, releases the connection of the input hub 42 and the output hub 26 and disconnects the engine 10 from the electric motor 20 before generating a regenerative braking force by generating a power in the electric motor 20. As such, because a rotation transmitted from an axle is not transmitted to the engine 10, a kinetic energy of the vehicle is regenerated in the electric motor 20 without being reduced by rotation resistance caused by a rotation of the engine 10.

Figure 4:
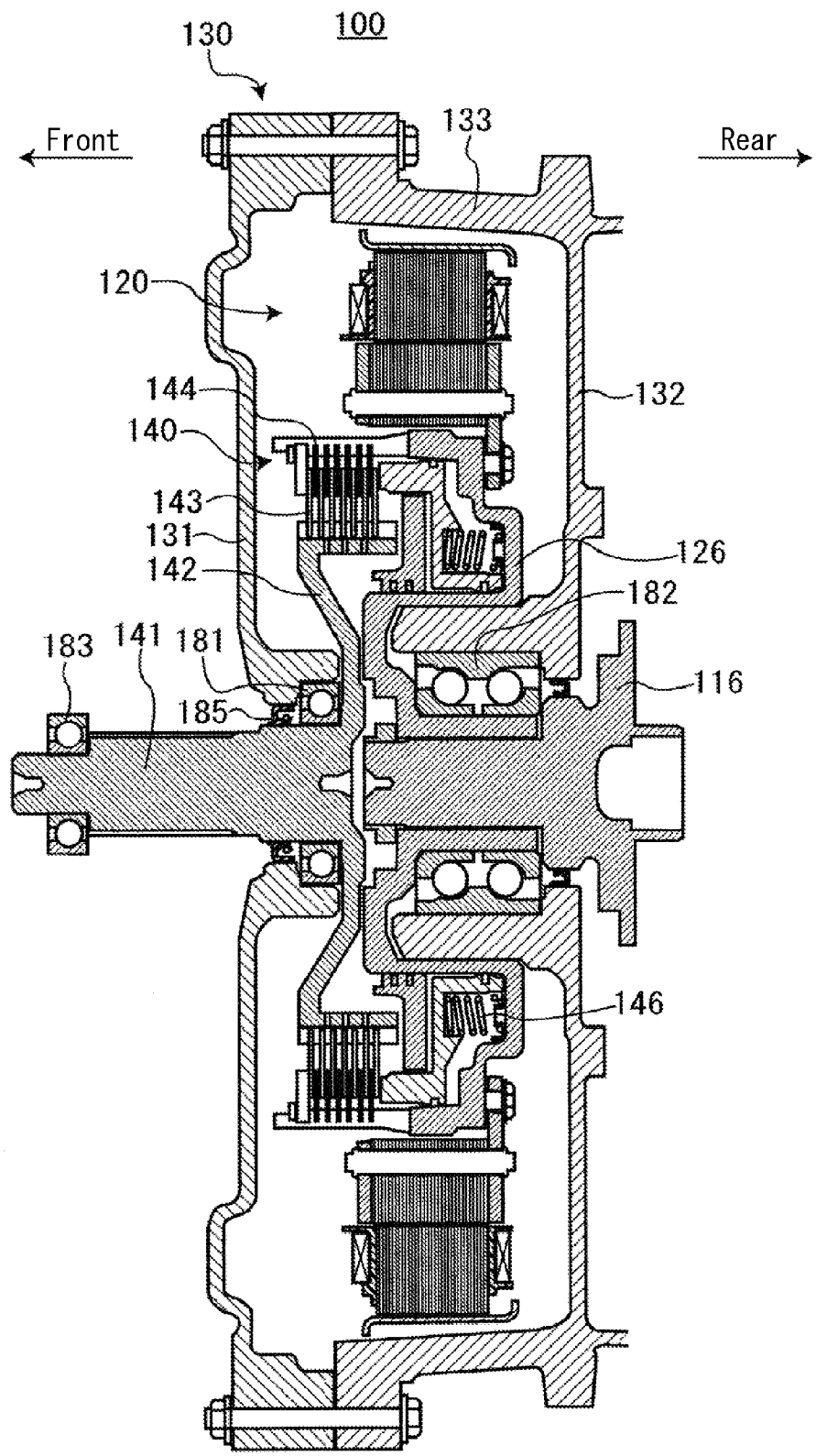
FIG. 4 is a cross-sectional view of a known drive system for a hybrid vehicle.

Followings, with reference to FIG. 4, are descriptions of differences of a known drive system for a hybrid vehicle 100 from the drive system for the hybrid vehicle 1 of the embodiment, followed by descriptions of effects and advantages of the drive system for the hybrid vehicle 1 of this embodiment. Regarding a part which contains a same function of the drive system for the hybrid vehicle 1 of this embodiment compared to the known drive system for the hybrid vehicle 100, 100 is added to a reference numeral indicated in FIG. 2. A part of descriptions of the part which contains the same function will be omitted.

As illustrated in FIG. 4, according to the known drive system for the hybrid vehicle 100, an output hub 126 is journaled by a multiple-row angular contact ball bearing 182 mounted to a rear sidewall portion 132.

Figure 2:
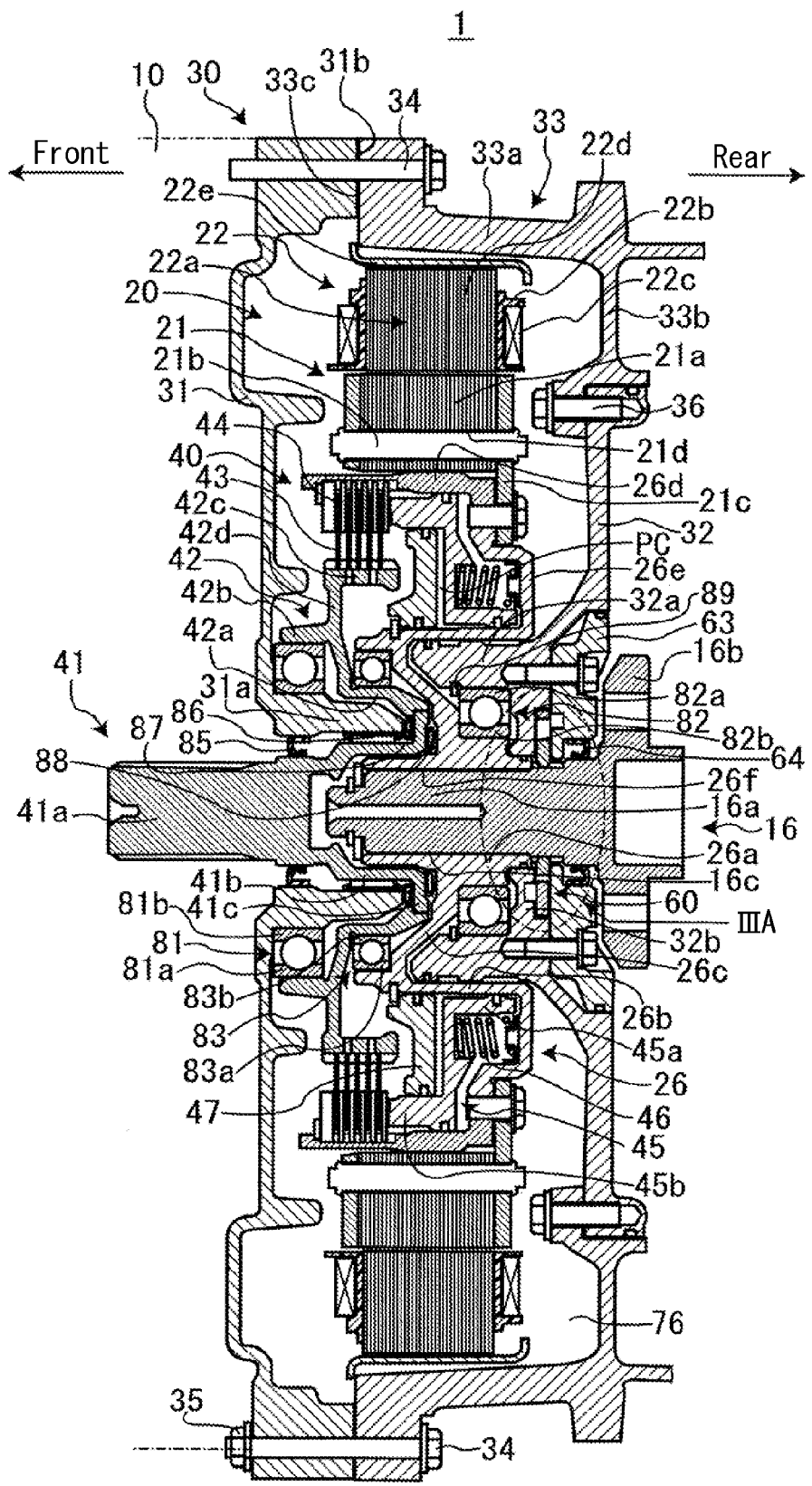
FIG. 2 is a cross-sectional view of the drive system for the hybrid vehicle illustrating the embodiment.

On the other hand, as illustrated in FIG. 2, according to the drive system for the hybrid vehicle 1 of this embodiment, a rear portion in the direction of the rotation axis of the output hub 26 is journaled by the second bearing 82 mounted to the rear sidewall portion 32 while a front portion in the direction of the rotation axis of the output hub 26 is journaled by the third bearing 83 fitted onto the input hub 42. Accordingly, the output hub 26 is journaled by the second bearing 82 and the third bearing 83 that are spaced apart in the direction of the rotation axis. Thus, compared to the structure in which the output hub 126 is supported by a single of the multiple-row angular contact ball bearing 182 at one side as in the known drive system for the hybrid vehicle 100 (illustrated in FIG. 4), in this embodiment, as the output hub 26 is supported at opposite sides in the axial direction by two bearings, the second bearing 82 and the third bearing 83 spaced apart in the direction of the rotation axis, the output hub 26 is journaled in a high stiffness state at the case 30 to restrain a core vibration of the output hub 26. Even in a case where the output hub 26 is rotated in a high speed, the engine 10 that has a high maximum rotation speed is supported as the core vibration of the output hub 26 is restrained. Further, as the core vibration is restrained in the output hub 26, the distance between the stator 22 and the rotor 21 is shortened to improve an efficiency of the electric motor 20.

As described above, because this embodiment has a structure in which the output hub 26 is supported at opposite sides in the axial direction by the two bearings, the second bearing 82 and the third bearing 83 (illustrated in FIG. 2), the second bearing 82 that journales at a rear portion of the output hub 26 in the direction of the rotation axis can be narrowed in width, instead of the wide-width, multiple-row angular contact ball bearing 182 (illustrated in FIG. 4), to refrain the core vibration of the output hub 26. Thus, by changing from the multiple-row angular contact ball bearing 182 to the second bearing 82 which is a single-row bearing, the oil pump 60 is placed at a space where the width of the bearing is reduced, resulting that the oil pump 60 is included in the drive system for the hybrid vehicle 1 without increasing the width of the drive system for the hybrid vehicle 1.

In this embodiment, the first tubular portion 42a having a cylindrical shape (the fitting portion of the bearing close to an input) is formed at the input hub 42 while, in the output hub 26, the fifth tubular portion 26b (the fitting portion of the bearing close to an output) is formed at least at a same position of the first tubular portion 42a in the direction of the rotation axis, and the third bearing 83 is fitted onto between the first tubular portion 42a and the fifth tubular portion 26b. Accordingly, as the third bearing 83 is fitted onto the position where the first tubular portion 42a and the fifth tubular portion 26b are positioned in an overlapped state in a radial direction, the input hub 42 and the output hub 26 are firmly rotatably supported. Thus, the core vibration in the output hub 26 is further refrained. Also, because the first tubular portion 42a and the fifth tubular portion 26b are positioned in an overlapped state in the radial direction, the width of the drive system for the hybrid vehicle 1 is shortened.

As illustrated in FIG. 4, the outer circumferential wall portion 133 and the rear sidewall portion 132 of the known device are made of light-weight aluminum alloy and configured integrally. On the other hand, in this embodiment, the outer circumferential wall portion 33 and the rear sidewall portion 32 are configured separately in which the outer circumferential wall portion 33 is made of light-weight aluminum alloy while the rear sidewall portion 32 is made from the abrasion-resistant member including cast iron (iron metal) that has the high abrasion-resistance. The pump wall portion 32b is formed at the center of an outer portion of the rear sidewall portion 32 in which the pump wall portion 32b is a part of the casing of the oil pump 60 that supplies the oil by a rotation of the output hub 26 (the turbine shaft 16). The outer portion of the rear sidewall portion 32 corresponds to a portion axially outward of the rear sidewall portion 32. Thus, the width of the oil pump 60 is shortened by at least the width of the casing in which the pump wall portion 32b is defined as a part of the casing. As the pump wall portion 32b (the rear sidewall portion 132) is made from an abrasion-resistant member, for example, iron metal including cast iron, the pump wall portion 32b working as a part of the casing of the oil pump 60 prevents abrasion in a case where the inner rotor 61 and the outer rotor 62 rotate.

As a secondary effect of the rear sidewall portion 132 made of iron metal, the core vibration in the output hub 26 journaled on the rear sidewall portion 132 by the second bearing 82 is refrained as the iron metal is stronger in bending strength than that of the aluminum alloy.

As illustrated in FIG. 4, according to the known drive system for the hybrid vehicle 100, a front portion of an input shaft 141 is journaled by a bearing 183 positioned at a case of an engine while a rear portion of the input shaft 141 is journaled by a bearing 181 positioned at the front sidewall portion 131. The input hub 142 is formed integrally at a rear end of the input shaft 141.

On the other hand, as illustrated in FIG. 2, according to the drive system for the hybrid vehicle 1 in this embodiment, the input hub 42 is connected to the rear end of the input shaft 41 and a front portion in the direction of the rotation axis of the input hub 42 is journaled by the first bearing 81 positioned at the first axial support portion 31a while the rear portion in the direction of the rotation axis of the input hub 42 is journaled by the third bearing 83 fitted onto the output hub 26 and the fourth bearing 86 positioned radially inward of the first axial support portion 31a. Thus, compared to the structure of the known drive system for the hybrid vehicle 100 in which a longitudinal portion of the input shaft 141 is journaled by the two bearings, the bearing 181 and the bearing 183 (illustrated in FIG. 4), the bearing 183 positioned at the engine case can be removed.

As illustrated in FIG. 4, according to the known drive system for the hybrid vehicle 100, a seal member 185 that contacts an outer circumferential surface of the input shaft 141 over an entire circumference to prevent the oil from leaking in a case 130 is positioned near to a front portion in the direction of the rotation axis of the bearing 181 on which the rear portion of the input shaft 141 is journaled.

On the other hand, as illustrated in FIG. 2, according to the drive system for the hybrid vehicle 1 of this embodiment, the first inner race 81b of the first bearing 81 is fitted onto an outer circumferential surface of the first axial support portion 31a having a tubular shape formed at the front sidewall portion 31 while the first seal member 85 is positioned contacting an outer circumferential surface of the input shaft 41 over an entire circumference at an inner circumferential surface of the first axial support portion 31a. In those circumstances, as the first bearing 81 and the first seal member 85 are positioned respectively on the outer circumferential surface and the inner circumferential surface of the first axial support portion 31a to sandwich the first axial support portion 31a, the first bearing 81 and the first seal member 85 are positioned at a same or near position relative to the direction of the rotation axis. Thus, compared to a structure of the known drive system for the hybrid vehicle 100 (illustrated in FIG. 4) in which the bearing 181 and the seal member 185 are positioned in a parallel arrangement, a width of the direction of the rotation axis of the drive system for the hybrid vehicle 1 can be shortened.

According to the embodiment illustrated in FIG. 2, the fifth tubular portion 26b of the output hub 26 is positioned radially outward of the first tubular portion 42a of the input hub 42. However, the embodiment can be as such that the first tubular portion 42a of the input hub 42 can be positioned radially outward of the fifth tubular portion 26b of the output hub 26 while the third bearing 83 fits between the first tubular portion 42a and the fifth tubular portion 26b.

According to the embodiment, the rear sidewall portion 32 is made of iron metal including cast iron as an abrasion resistant member. However, for example, titan can be used as the abrasion resistant member. Alternatively, the rear sidewall portion 32 can be made of light-weight metal including aluminum alloy while a stiffer surface processing layer can be formed by, for example, plate processing or nitride processing for an inner wall surface of the outer rotor housing portion 32c to improve an abrasion resistance for the inner wall surface of the outer rotor housing portion 32c.

According to the aforementioned embodiment, while the automated transmission device 5 has a planetary gear mechanism, technical thoughts of this embodiment are applied to vehicles mounting, for example, a continuously variable transmission (CVT), a dual clutch transmission (DCT) and an automated manual transmission (AMT).

According to the aforementioned embodiment, the drive system for the hybrid vehicle 100 includes the electric motor 20 including the stator 22 and the rotor 21 positioned at an inner circumferential portion of the stator 22 to be rotatably relative to the stator 22, the input hub 42 rotatably connected to the engine 10, the output hub 26 to which the rotor 21 is mounted, and the clutch device 40 connecting and disconnecting the input hub 42 to the output hub 26. The drive system for the hybrid vehicle 100 further includes the case 30 including the front sidewall portion 31, the rear sidewall portion 32 positioned to face the front sidewall portion 31, and the outer circumferential wall portion 33 connecting the outer circumferential portion of the front sidewall portion 31 to the outer circumferential portion of the rear sidewall portion 32 and housing the electric motor 20, the input hub 42, the output hub 26 and the clutch device 40, the first bearing 81 on which the input hub 42 is journaled and mounted to the front sidewall portion 31, the second bearing 82 on which the output hub 26 is journaled and mounted to the rear sidewall portion 32, and the third bearing 83 positioned between the first bearing 81 and the second bearing 82 relative to the direction of the rotation axis of the input hub 42 and the output hub 26, and fitting onto the input hub 42 and the output hub 26, and relatively rotatably supporting the input hub 42 and the output hub 26.

According to the above described structure, the input hub 42 is journaled by the first bearing 81 provided at the front sidewall portion 31, the output hub 26 is journaled by the second bearing 82 provided at the rear sidewall portion 32, and the input hub 42 and the output hub 26 are relatively rotatably supported by the third bearing 83 that is positioned between the first bearing 81 and the second bearing 82 relative to the direction in the rotation axis and fits onto the input hub 42 and the output hub 26. Accordingly, the output hub 26 is journaled by the second bearing 82 and the third bearing 83 spaced apart in the direction of the rotation axis. Thus, compared to a structure in which the output hub 126 is supported by a single bearing at one side as in the known drive system for the hybrid vehicle 100, the output hub 26 is journaled in a high stiffness state at the case 30 to restrain the core vibration of the output hub 26 because the output hub 26 is supported at opposite sides in the axial direction by two bearings, the second bearing 82 and the third bearing 83 spaced apart in the direction of the rotation axis.

According to the aforementioned embodiment, the drive system for the hybrid vehicle 100 further includes the first axial support portion 31a having a cylindrical shape formed at the front sidewall portion 31 and protruding inwardly of the case 30, the input shaft 41 positioned at an inner circumference of the first axial support portion 31a and protruding outwardly from the front sidewall portion 31 and connecting the input hub 42 and rotatably engaging with the engine 10, the first seal member 85 positioned at the inner circumferential surface of the first axial support portion 31a and contacting the outer circumferential surface of the input shaft 41 over the entire circumference, in which the first inner race 81b of the first bearing 81 is fitted onto the outer circumferential surface of the first axial support portion 31a and the first outer race 81a of the first bearing 81 is fitted onto the input hub 42.

According to the above described structure, the first inner race 81b of the first bearing 81 fits onto an outer circumference of the first axial support portion 31a having a substantially cylindrical shape formed at the front sidewall portion 31 while the first seal member 85 is provided contacting the outer circumferential surface of the input shaft 41 over the entire circumference. Thus, as the first bearing 81 and the first seal member 85 are positioned respectively at the outer circumferential surface and the inner circumferential surface of the first axial support portion 31a to sandwich the first axial support portion 31a, the first bearing 81 and the first seal member 85 are positioned at the position the same or near relative to the direction of the rotation axis. Thus, compared to the structure of the known drive system for the hybrid vehicle 100 in which the bearing 181 and the seal member 185 are positioned in the parallel arrangement, a width of the drive system for the hybrid vehicle in the direction of the rotation axis can be shortened.

According to the aforementioned embodiment, the drive system for the hybrid vehicle 100 further includes the pump wall portion 32b formed at the center of the outer portion of the rear sidewall portion 32, the casing 63 mounted axially outward of the pump wall portion 32b, the outer rotor housing portion 32c formed between the pump wall portion 32b and the rear sidewall portion 32, the outer rotor 62 in which inner teeth 62a are formed, rotatably housed in the outer rotor housing portion 32c, the inner rotor 61, housed radially inward of the inner teeth 62a, on which outer teeth 61a engaging with the inner teeth 62a are formed, and rotating by the rotation of the output hub 26, and the oil pump 60 supplying the oil by the rotation of the output hub 26.

According to the above described structure, the pump wall portion 32b is formed at the center of the outer portion of the rear sidewall portion 32. The pump wall portion 32b is a part of the casing 63 of the oil pump 60 supplying an oil by the rotation of the output hub 26. Thus, the width of the oil pump 60 is shortened by at least the width of the casing in which the pump wall portion 32b is defined as a part of the casing.

According to the aforementioned embodiment, the drive system for the hybrid vehicle 1 further includes the electric motor 20 including the stator 22 and the rotor 21 relatively rotatable to the stator 22, the input hub 42 connected to the engine 10, the output hub 26 to which the rotor 21 is mounted, and the clutch device 40 connecting and disconnecting the input hub 42 to the output hub 26. The drive system for the hybrid vehicle further includes the case 30 including the front sidewall portion 31, the rear sidewall portion 32, and the outer circumferential wall portion 33 connecting the outer circumferential portion of the front sidewall portion 31 to the outer circumferential portion of the rear sidewall portion 32, the outer circumferential wall portion 33 mounting the stator 22 and housing the electric motor 20, the input hub 42, the output hub 26 and the clutch device 40, the first bearing 81 on which the input hub 42 is journaled and mounted between the front sidewall portion 31 and the input hub 42, the second bearing 82 on which the output hub 26 is journaled and mounted between the rear sidewall portion 32 and the output hub 26, and a third bearing 83 positioned between the first bearing 81 and the second bearing 82, and between the input hub 42 and the output hub 26, in which the input hub 42 and the output hub 26 are relatively rotatably supported.

According to the aforementioned embodiment, the drive system for the hybrid vehicle 1 further includes the first axial support portion 31a having a cylindrical shape formed at the front sidewall portion 31 and protruding inwardly of the case 30, the input shaft 41 positioned at the inner circumference of the first axial support portion 31a and protruding outwardly from the front sidewall portion 31 and connecting the input hub 42 and engaging to the engine 10, and the first seal member 85 positioned at the inner circumferential surface of the first axial support portion 31a and contacting the outer circumferential surface of the input shaft 41 over the entire circumference, wherein the first inner race 81b of the first bearing 81 is fitted onto the outer circumferential surface of the first axial support portion 31a, the tubular portion is formed at the input hub 42, and the first outer race 81a of the first bearing 81 is fitted onto the inner circumference of the tubular portion.

According to the aforementioned embodiment, the drive system for the hybrid vehicle 100 further includes the seal member provided within a range of the first bearing in the axial direction of the input shaft.

According to the aforementioned embodiment, the first bearing and the third bearing are provided at the outward of the second bearing in the radial direction.

According to the aforementioned embodiment, the first bearing and the third bearing are provided at the opposite sides relative to the input hub in the axial direction.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:
1. A drive system for a hybrid vehicle, comprising:
an electric motor including a stator and a rotor positioned at an inner circumferential portion of the stator to be rotatably relative to the stator;
an input hub rotatably connected to an engine;
an output hub to which the rotor is mounted;

a clutch device connecting and disconnecting the input hub to the output hub;

a case including a front sidewall portion, a rear sidewall portion positioned to face the front sidewall portion, and an outer circumferential wall portion connecting an outer circumferential portion of the front sidewall portion to an outer circumferential portion of the rear sidewall portion, the case housing the electric motor, the input hub, the output hub and the clutch device;

a first bearing on which the input hub is journaled and mounted to the front sidewall portion;

a second bearing on which the output hub is journaled and mounted to the rear sidewall portion;

a third bearing positioned between the first bearing and the second bearing relative to a direction of a rotation axis of the input hub and the output hub, the third bearing fitting onto the input hub and the output hub, the third bearing relatively rotatably supporting the input hub and the output hub;

a pump wall portion formed at a center of an outer portion of the rear sidewall portion;

a casing mounted axially outward of the pump wall portion;

an outer rotor housing portion formed between the pump wall portion and the rear sidewall portion;

an outer rotor on which inner teeth are formed, being rotatably housed in the outer rotor housing portion;

an inner rotor, housed radially inward of the inner teeth, on which outer teeth engaging with the inner teeth are formed, and rotating by a rotation of the output hub; and an oil pump supplying an oil by the rotation of the output hub.

2. The drive system for the hybrid vehicle according to claim 1, further comprising:

a cylindrically-shaped axial support portion formed at the front sidewall portion and protruding inwardly of the case;

an input shaft positioned at an inner circumference of the axial support portion and protruding outwardly from the front sidewall portion, the input shaft connecting the input hub and rotatably engaging with the engine; and a seal member positioned at an inner circumferential surface of the axial support portion and contacting an outer circumferential surface of the input shaft over an entire circumference, wherein an inner race of the first bearing is fitted onto an outer circumferential surface of the axial support portion and an outer race of the first bearing is fitted onto the input hub.

3. A drive system for a hybrid vehicle, comprising:

an electric motor including a stator and a rotor relatively rotatable to the stator;

an input hub connected to an engine;

an output hub to which the rotor is mounted;

a clutch device connecting and disconnecting the input hub to the output hub;

a case including a front sidewall portion, a rear sidewall portion, and an outer circumferential wall portion connecting an outer circumferential portion of the front sidewall portion to an outer circumferential portion of the rear sidewall portion, an outer circumferential wall portion mounting the stator, the case housing the electric motor, the input hub, the output hub and the clutch device;

a first bearing on which the input hub is journaled and mounted between the front sidewall portion and the input hub;

a second bearing on which the output hub is journaled and mounted between the rear sidewall portion and the output hub;

a third bearing positioned between the first bearing and the second bearing, and between the input hub and the output hub, the third bearing in which the input hub and the output hub are relatively rotatably supported;

a cylindrically-shaped axial support portion formed at the front sidewall portion and protruding inwardly of the case;

an input shaft positioned at an inner circumference of the axial support portion and protruding outwardly from the front sidewall portion, the input shaft connecting the input hub and engaging to the engine; and a seal member positioned at an inner circumferential surface of the axial support portion and contacting an outer circumferential surface of the input shaft over an entire circumference, wherein an inner race of the first bearing is fitted onto an outer circumferential surface of the axial support portion, a tubular portion is formed at the input hub, and an outer race of the first bearing is fitted onto an inner circumference of the tubular portion.

4. The drive system for the hybrid vehicle according to claim 3, wherein the seal member is provided within a range defined by an axial extent of the first bearing in an axial direction of the input shaft.

5. The drive system for the hybrid vehicle according to claim 3, wherein the first bearing and the third bearing are provided radially outward of the second bearing.

6. The drive system for the hybrid vehicle according to claim 5, wherein the first bearing and the third bearing are provided at opposite sides relative to the input hub in an axial direction.

* * * * *